(12) United States Patent
Schleinitz et al.

(10) Patent No.: US 6,702,267 B2
(45) Date of Patent: Mar. 9, 2004

(54) HYDRAULIC BEARING

(75) Inventors: Uwe Schleinitz, Bad Soden-Salmünster (DE); Eyk Karus, Bad Soden-Salmünster (DE); Stefan Nix, Wächtersbach (DE)

(73) Assignee: WOCO AVS GmbH, Bad Soden-Salmunster (DE)

( * ) Notice: Subject to any disclaimer, the term of this patent is extended or adjusted under 35 U.S.C. 154(b) by 0 days.

(21) Appl. No.: 09/959,234

(22) PCT Filed: Feb. 23, 2001

(86) PCT No.: PCT/EP01/02113
§ 371 (c)(1),
(2), (4) Date: Jan. 16, 2002

(87) PCT Pub. No.: WO01/63142
PCT Pub. Date: Aug. 30, 2001

(65) Prior Publication Data
US 2002/0158387 A1 Oct. 31, 2002

(30) Foreign Application Priority Data
Feb. 23, 2000 (DE) .......................... 100 09 544
Jan. 29, 2001 (DE) .......................... 101 04 936

(51) Int. Cl.⁷ .................. F16F 7/00; F16M 13/00; F16M 1/00
(52) U.S. Cl. .............. 267/226; 267/140.3; 267/140.14; 248/562
(58) Field of Search .................. 267/140.13, 140.3, 267/226, 33, 34, 140.2, 140.14, 140.4, 294, 64.27, 221; 248/562, 635

(56) References Cited
U.S. PATENT DOCUMENTS 2,270,335 A * 1/1942 Parkinson et al. ....... 267/140.2
2,524,405 A * 10/1950 Storrs ..................... 105/198.7

(List continued on next page.)

FOREIGN PATENT DOCUMENTS

| DE | 41 39 048 A1 | 6/1993 |
| DE | 195 43 239 A1 | 5/1997 |
| DE | 195 44 126 A1 | 5/1997 |
| EP | 0 278 798 A1 | 8/1988 |
| GB | 2027517 A | * 2/1980 |
| JP | 61201946 A | * 9/1986 |
| JP | 4341628 A | * 11/1992 |
| JP | 5231469 A | * 9/1993 |
| JP | 62735 A | * 1/1994 |
| JP | 650378 A | * 2/1994 |
| JP | 674284 A | * 3/1994 |
| JP | 6137366 A | * 5/1994 |
| JP | 9151985 A | * 6/1997 |

Primary Examiner—Matthew C. Graham
Assistant Examiner—Melody M. Burch
(74) Attorney, Agent, or Firm—Burns, Doane, Swecker & Mathis, LLP

(57) ABSTRACT

The invention relates to a hydraulic bearing, especially for supporting motor vehicle assemblies, that includes a supporting connection, a buttress connection which lies axially opposite the supporting connection and a bearing spring element which is located between these two and which includes (i) an elastomer radial spring, (ii) an expanding spring which is configured as a separate molded elastomer part in the form of a bell-type rolling membrane and which forms part of a hydraulic damping system between the supporting connection and the buttress connection, and (iii) an axially upright steel helical spring. The hydraulic damping system includes a working chamber, a throttle channel and a compensation chamber. A bearing housing radially surrounds the bearing spring element and the hydraulic damping system and is supported by the buttress connection.

13 Claims, 2 Drawing Sheets

U.S. PATENT DOCUMENTS

Figure 1:
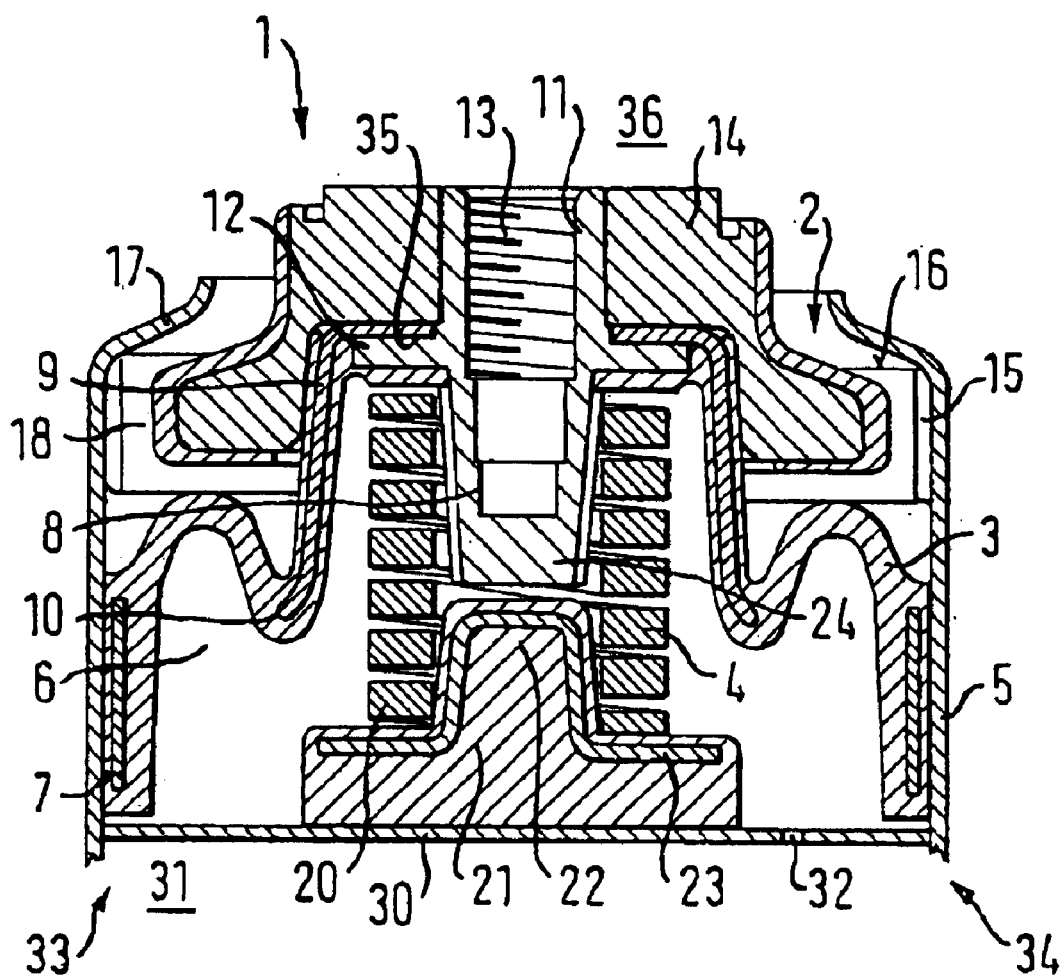

| | | | | |
|---|---|---|---|---|
| 2,678,796 A | * | 5/1954 | Roy | 248/613 |
| 2,687,269 A | * | 8/1954 | Titus et al. | 267/140.11 |
| 2,900,162 A | * | 8/1959 | Crede et al. | 267/140.13 |
| 3,603,610 A | * | 9/1971 | Thompson | 267/221 |
| 3,874,646 A | * | 4/1975 | Vernier | 267/140.13 |
| 3,883,101 A | * | 5/1975 | Vernier | 267/140.13 |
| 3,947,007 A | * | 3/1976 | Pelat | 267/140.13 |
| 4,342,884 A | * | 8/1982 | Ban et al. | 188/282.1 |
| 4,399,987 A | | 8/1983 | Cucelli et al. | |
| 5,060,917 A | | 10/1991 | DuBos et al. | |
| 5,632,474 A | * | 5/1997 | Hayakawa et al. | 267/226 |
| 5,642,873 A | * | 7/1997 | Kato | 267/140.14 |
| 5,667,205 A | * | 9/1997 | Mutoh et al. | 267/140.13 |
| 5,860,638 A | | 1/1999 | Wolf et al. | |
| 5,911,412 A | * | 6/1999 | Durand et al. | 267/140.13 |
| 5,988,610 A | * | 11/1999 | Hiraki et al. | 267/140.13 |

* cited by examiner

HYDRAULIC BEARING

The invention relates to a hydraulic bearing according to the preamble of claim 1.

Hydraulically damped power unit bearings of the aforementioned kind should meet functional demands whose contradictory purposes require contradictory solutions accordingly. First of all, such power unit bearings are used to couple the power unit, especially of a motor vehicle, to the chassis. In the power unit's static state of rest the static load of the power unit in the z-direction, which is perpendicular to the transverse and longitudinal extension of the motor vehicle, must be carried. Furthermore, when using an embodiment of the hydraulic bearing for a motor vehicle, the relative movement between the power unit and the chassis occurring under dynamic operational conditions must be limited. This requires high spring stiffness in all three coordinate directions. At the same time, such a hydraulic bearing is designed to isolate motor vibrations and therefore not to transmit these disturbing vibrations from the motor to the chassis. This requires a spring stiffness which is as low as possible. Since in common hydraulic bearings the supporting spring defines at the same time the boundary of a hydraulic working chamber, to be effective it should provide a large pumping area for the hydraulic fluid and a large volume stiffness.

These cross-purpose objectives may be summarized into two pairs of conflicts: The elastomer spring system of a hydraulic bearing used in a motor vehicle has to provide a large bearing displacement in the axial direction and at the same time a large extension path in the radial direction. Additionally, the elastomer spring system has to isolate resonances and disturbing vibrations and at the same time provide high dynamical long-lasting strength and volume stiffness.

According to the state of the art, several attempts are known to find a compromise between these cross-purpose objectives for the design of a supporting spring of a hydraulic bearing.

The publication of a German patent application DE 195 43 239 A1 describes weakening the supporting spring of the hydraulic bearing by means of recesses in the spring so that expansion areas are formed on the one hand. On the other hand the spring is smoothed in its spring behaviour to an extent that it meets the requirements for an isolation of vibrations. In order to satisfy the requirements regarding the static and dynamical load of the power unit, a supporting metal spring is located in the hydraulic working chamber. The metal spring limits the relative movement between the power unit and the chassis and supports the static and dynamical load of the power unit which rests on such bearings. Such a compromise, however, reduces the volume stiffness of the supporting spring, which is an essential feature for a sufficient dampening function of the bearing.

The compromise, according to the state of the art, lies in an extensionable elastomer membrane control spring which envelopes the metal spring by forming a control chamber. It can be hydraulically influenced and is located in the working chamber. The price paid by the state of the art is a complete additional control mechanism for the control spring correcting the spring characteristic of the radial spring. This is integrated with the expansion bladder. Another disadvantage is the high breakdown rate of the bearings caused by breakage of the metal spring due to unavoidable dynamical load.

In the light of this state of the art, it is an objective of the invention to create a hydraulic bearing enabling an improved balance between the bearing characteristics, the aims of which contradict each other. The invention solves this problem by a hydraulic bearing comprising the features of claim 1.

The basic concept of the invention is not only to constructively separate the axial supporting spring and the radial spring of the hydraulic bearing but also to constructively separate the expansion bladder and the radial spring. In contrast to the state of the art, the expansion bladder and the radial spring provide not only one but two elastomer bodies which are completely independent of one another. The expansion bladder is no longer formed by means of recesses located in the radial spring but by a rolling membrane as a second spring element separated from the radial spring. Due to this consequent splitting up of the common bearing body into an expansion bladder and a separate radial spring, both spring elements can be optimised independently of one another according to their specific requirements. The stiffness of the radial spring may be anisotropic for example. With respect to the helical supporting spring the stiffness relations between Z, X and Y may be adjusted to 10 to 1 to 1, respectively. Without changing the dimensions of the hydraulic bearing in general, other relationships of stiffness between Z, X and Y may be adjusted for example to 1 to 5 to 5, respectively. This is possible since there is no need for an elastomer bearing body to be extensible with respect to its configuration and dimensions even after the separation of the spring functions into a supporting spring and a radial spring. Moreover, both components, the radial spring as well as the separate expansion bladder, may be designed by choosing the stiffness and the quality of the used elastomer in accordance with the requirements of their respective applications. Other spring qualities, as for example temperature and the stability of the elastomer may only be realized when needed.

In top view of the hydraulic bearing in the direction from the load-side connection to the chassis-side connection the expansion bladder is located behind the radial spring inside the hydraulic bearing, forming a unique and exclusive membrane wall enclosing the hydraulic working chamber. In order to ensure a coordinative cooperation of the three spring elements, namely the supporting spring, the radial spring and the expansion bladder, the radial spring as well as the expansion bladder provide rigid coupling elements rigidly coupling and connecting the three spring components in a force-fit, a form-fit or a friction locked manner. According to an embodiment of the invention the radial spring and the expansion bladder provide inner metallic pieces. These inner metallic pieces are incorporated into the elastomer, being centrally located in axial direction and coaxial to one another and connected with each other in a fixed and rigid way by form-fit, force-fit, especially slug fit or frictional lock. Advantageously, a torsional safety device between the two inner pieces of the radial spring and the expansion bladder is formed, especially due to a seat configuration in the coupling area of the two inner pieces whose symmetry differs from a circle or due to tongue groove joint. In this way, the inner composite comprising the inner piece of the expansion bladder and the inner piece of the radial spring rests on the load-sided top of the helical supporting spring which is made of steel for example. This supporting spring directly or indirectly rests on the chassis-side connection of the hydraulic bearing. The term "indirectly" denotes for resting of the supporting spring on intermediate elements of the hydraulic bearing, for example a common radial separating disc which itself rests on the real chassis or the chassis-side connection of the hydraulic bearing.

The known bearing body of the hydraulic bearing had to serve as a pumping area, an expansion bladder and at the same time as a supporting spring. Furthermore and also at the same time, it functioned as a radial spring. Due to the disintegration, a hydraulic bearing may be constructed Without a constructively greater effort and without a complicated additional control mechanism, whose spring characteristics are independently adjustable for each of the three principle axes as well as for each resulting axis according to the requirements of its application.

Due to these new constructional possibilities regarding the configuration of the hydraulic bearing, enabling even a relative smooth configuration of the radial spring at least in a predetermined direction, the helical steel spring which is used as a supporting spring may be subject to increasing radial strain. In order not to limit the design possibilities of the radial spring and not to accept restrictions of the configuration and dimensions of the supporting spring caused by compromise made, according to a further embodiment of the invention, the supporting spring only indirectly rests on the chassis-side connection of the hydraulic bearing in such a way, that it axially rests on an elastomer buffer or an elastomer thrust spring. The central spigot provided at the load-side of the thrust spring may have a centering effect with regard to the supporting spring resting on the thrust spring. Furthermore, the central spigot may act as a dampening stopper, provided the bearing is constructed accordingly. Said centering spigot is designed in correspondence to the inner contour of the helical spring used as a supporting spring and in such a way that it extends into the axial spring resting on it.

According to a further embodiment of the invention an additional stabilisation of the centering spigot formed at the thrust spring may be provided by vulcanizing a cup-shaped sheet metal into the centering spigot comprising an outer flange and opening towards the chassis-side.

Due to this design of the chassis-side support of the helical spring made of steel, share stresses may be effectively compensated. These share stresses cause well-known breakage of all kinds of helical springs rigidly supported at their chassis-side.

Therefore, it should be mentioned that said bearing or support of the supporting spring bearing, which has been described as an embodiment of the invention, may also be used in hydraulic bearings not being covered by the scope of disclosure.

Further developments of the inventions are subject matter of the dependent claims.

Figure 2:
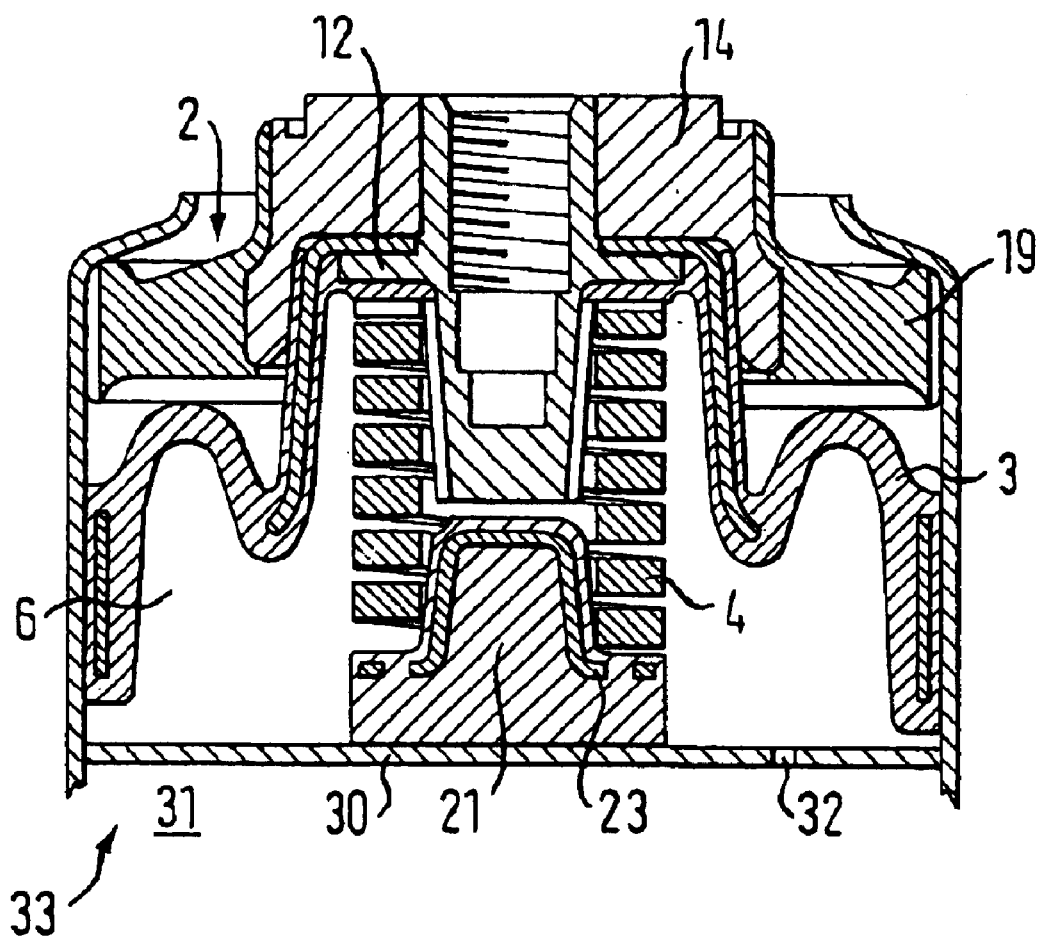

In the following, the invention is described in more detail according to embodiments with respect to the drawings illustrating in:

FIG. 1: the load-sided top of a hydraulic bearing according to the invention in axial section and in partial view;

FIG. 2: the hydraulic bearing according to FIG. 1 also in axial section however clockwise rotated by 90° around the central axis of the bearing.

In FIG. 1 the load-sided top of the hydraulic bearing is shown in axial section having a load 36, whose remaining parts, which are not shown in FIG. 1, are constructed according to the state of the art. In FIG. 2 the embodiment according to FIG. 1 is clockwise rotated by 90° around the longitudinal axis of the bearing. All the features of the invention adapted to the specific embodiment are shown in FIG. 1. It is therefore superfluous to mention or illustrate the chassis-side elements of the hydraulically damped supporting bearing, which are well-known and part of the state of the art.

The embodiment of the invention shown in the figures is used for bearing of a power unit of a motor vehicle. It comprises a load-side connection 1, a common chassis-side connection 34, axially opposing the load-side connection, and a disc-shaped elastomer spring as a radial spring 2 between said connections, an elastomer membrane spring forming an expansion bladder 3 which provides a rolling membrane and a helical spring as a supporting spring 4 made of steel.

This spring system of the hydraulic bearing is enclosed by a cylindrical and a cranked cylindrical housing of the bearing made of steel. The expansion bladder 3 bounds a hydraulic working chamber 6 by forming an elastically deformable pumping wall at its load side. The chassis side 33 of the working chamber 6 is closed up by a common separating disc 30, comprising a throttling channel 32 opening on the one hand into the hydraulic working chamber 6 and on the other hand into an usual equalising chamber 31 formed in a well-known manner under the chassis-sided surface of the separating disc 30.

The expansion bladder 3 is formed as a rolling membrane having a contour and a pumping area in accordance with the dampening requirements. The pumping volume of the hydraulic liquid as well as the volume stiffness of the dampening may be constructively designed and adapted by choosing a suitable material and/or by configuring the rolling membrane according to the requirements. These design possibilities are independent from other spring characteristics of the hydraulic bearing.

The expansion bladder 3 is fixed to the inner surface of the wall of the housing 5 by a vulcanized bearing ring 7. At the load side the expansion bladder 3 comprises a core 8 made of a rigid material and preferentially made of steel. A bell-shaped apron 9 preferentially made of metal is integrally formed with the core 8. Alternatively, the apron is formed as a separate component and rests loosely on the core 8. This apron 9 stiffens the rolling membrane 3, especially the pre-formed rolling plead 10 between a bearing ring 7 and core 8.

Generally, the spring stiffness of the expansion bladder 3 is extraordinarily small in all three space co-ordinates due to the configuration of the expansion bladder as a rolling membrane. This prevents or essentially prevents the occurrence of spring properties, or better said the falsifying spring properties influencing the bearing stiffness of the hydraulic bearing which is threedimensionally tuned. Furthermore, such an expansion bladder 3 designed in this way may be adjusted for an optimized high frequency dampening effect without any compromise due to the required bearing stiffness. Additionally, a large pumping area may be provided, enabling the pumping damper of the hydraulic bearing to be subject to a large displacement path both in axial and radial direction without influencing the high frequency damping behaviour of the bearing.

In the embodiment shown, the core 8 of the expansion bladder 3 is formed as a cylindrical component 11, essentially extending in axial direction having an annular outer flange 12 located in axially central position. The core opens to the load side having a central internal threaded bore in order to connect the power unit to be carried by a screw connection. The rolling membrane is vulcanized onto or around the annular flange 12 of the core 8 or it is adhered thereto. In the embodiment shown the apron 9 is put on the flange 12 of the core 8 from the load side. Therefore, the bell-shaped apron loosely hangs on the flange 12 of the core 8. The core 8 of the rolling membrane 3 rests with a surface of the flange 12 coated with the elastomer of the rolling membrane on the load-sided top of the supporting spring 4. As shown in FIG. 1, for example, the annular flange 12 engages a recess 35 of the bell-shaped apron of the expansion bladder 3. Therefore, an axial load 36 received by the bearing is transmitted by the core 8 of the rolling membrane 3, acting as a connecting and transmitting component. Accordingly, the core transmits axial forces into the hydraulic bearing and to the supporting spring 4.

The inner part or the core 8 of the rolling membrane 3 comprises a sleeve portion 11 which is disposed at the load side of the annular flange 12. The sleeve portion 11 penetrates an inner bore formed complementary thereto in the inner part or connection 14 of the radial spring 2. Due to this engagement both core pieces 8 and 14 are rigidly connected with one another. In detail, this connection may form-locking or force-locking or a form-locking and force-locking combination thereof in such a way, that a gear-tooth system or joggle is provided in addition to a press fit. Thus, a torsional safety device 37 is created for these components.

The core piece 14 of radial spring 2 of the connection 1 is surrounded by an outer ring 15 in particular made of steel. A disc-like elastomer spring 16, moderately pre-stressed, if required, is inserted between the core piece 14 and the outer ring 15 connecting both components. The whole radial spring is pressed in a force-locking manner into the bearing sleeve 5. The curl 17 of the housing's upper periphery acts as an additional securing stopper interacting by the occurrence of high axial displacements of the bearing.

The spring characteristics of the radial spring 2 may be adjusted independently of one another in any radial direction. The easiest way in doing so is to form recesses 18 by cutting out the disc-shaped matrix 19 of the elastomer body 16 of the radial spring 2. It is self-evident that such axial anisotropies of the radial spring in different radial directions may also be realized by alternative techniques, for example by manufacturing the elastomer spring 16 as a multicomponent spring.

The supporting spring of the hydraulic bearing carries the loaded core 8 of the expansion bladder which extends into the supporting spring acting as a centering device. The chassis-sided end of the supporting spring rests on an elastomer buffer 21 elastically supporting the supporting spring. Said buffer is comparatively smooth in radial direction. At its load-sided top a dome is formed in central position acting as centering spigot 22. At the same time it is used as a transducer of radial forces or share stresses. Preferentially, this centering spigot is slightly conical tapering towards the load side.

In the load-sided top section of the elastomer buffer 21 a profiled metal sheet 23 is vulcanized following the threedimensional surface contour of the elastomer buffer. Preferably, it is located directly under the surface of the elastomer buffer as shown in the drawings. In detail, the elastomer layer on the profiled metal sheet is as thin as possible but at the same time as thick as necessary in order to dampen and support the supporting spring in a durable and wear-resisting way.

As shown in the figures, the axial extensions of the centering spigot 22 of the thrust spring 21 in direction to the load side and the axial extensions of the centering spigot 24 of the core 8 of the expansion bladder 3 are dimensioned in such a way that the front faces of these centering spigots opposing each other act as buffers for limiting axial displacements due to high loads in axial direction. The distance between the two front faces of the centering spigots under operational static load therefore corresponds with the maximum displacement of the hydraulic bearing. Said distance is preset by construction and may be extended due to the elastic relaxation of the elastomer buffer 21.

What is claimed is:

1. Hydraulic bearing comprising: a load-side connection; an axially opposed chassis-side connection; a spring element located between the load-side connection and the chassis-side connection and comprising an elastomer spring acting as an expansion bladder and a radial spring, and an axially extending helical spring acting as an axial supporting spring; a housing radially enveloping said spring element of the bearing and resting on a chassis; and a hydraulic damping system located between the load-side connection and the chassis-side connection comprising a working chamber, a throttling channel and an equalising chamber, the radial spring and the expansion bladder constituting two spring systems formed as separate elastomer components, the radial spring and the expansion bladder being connected at a load side of the supporting spring by coupling pieces which are rigidly connected with each other in a force-locking or form-locking way, the expansion bladder being connected to the housing, a metallic sleeve connected with the supporting spring and acting as one of the coupling pieces, said metallic sleeve being integrally formed with an annular flange, which is clamped between the helical spring and another of the coupling pieces of the radial spring, and being provided with a threaded inner bore opening at its load-side for connecting the load, wherein the annular flange engages a complementary recess of a bell-shaped apron of the expansion bladder.

2. Hydraulic bearing according to claim 1, wherein the radial spring is formed as a disc-shaped elastomer spring whose outer periphery is directly or indirectly clamped at an inner surface of the housing surface in an axially fixing way.

3. Hydraulic bearing according to claim 1, wherein the radial spring is a disc-shaped elastomer spring which is directly or indirectly clamped in the housing by bar-shaped radial bridges that are radially pre-stressed.

4. Hydraulic bearing according to claim 1, including cylindrical rings each enclosing at least one of the radial spring and the expansion bladder at its outer periphery or being vulcanized to the outer periphery of the elastomer body of one of the radial spring and the expansion bladder, said cylindrical rings being dimensioned in such a way that at least one of the radial spring and the expansion bladder may be press-fitted, as a prefabricated component, into the housing for providing a press-fit, the housing having a sleeve-shaped form.

5. Hydraulic bearing according to claim 1, including an axial press-fit between the coupling pieces.

6. Hydraulic baring according to claims 5, including a torsional safety device between the coupling pieces located in the axial press-fit.

7. Hydraulic bearing according to claim 1, wherein the helical spring is made of steel.

8. Hydraulic bearing according to claim 1, including a thrust spring formed as an elastomer buffer while being smooth in a radial direction, the thrust spring supporting the helical spring.

9. Hydraulic bearing comprising: a load-side connection; an axially opposed chassis-side connection; a spring element located between the load-side connection and the chassis-side connection and comprising an elastomer spring acting as an expansion bladder and a radial spring, and an axially extending helical spring acting as an axial supporting spring; a housing radially enveloping said spring element of the bearing and resting on a chassis; and a hydraulic damping system located between the load-side connection and the chassis-side connection comprising a working chamber, a throttling channel and an equalising chamber, the radial spring and the expansion bladder constituting two spring systems formed as separate elastomer components, the radial spring and the expansion bladder being connected at a load side of the supporting spring by coupling pieces which are rigidly connected with each other in a force-locking or form-locking way, the expansion bladder being connected to the housing, wherein a thrust spring is formed as an elastomer buffer while being smooth in a radial direction, the thrust spring supporting the helical spring, a profiled metal sheet which is vulcanized at a top of the thrust spring and follows a three dimensional surface contour of the thrust spring.

10. Hydraulic bearing according to claim 9, wherein the supporting spring is a pressure spring onto which the expansion bladder is clamped to bound the load side of the hydraulic working chamber in a pressure-proof and fluid tight manner.

11. Hydraulic bearing according to claim 9, including a metallic sleeve connected with the supporting spring and acting as one of the coupling pieces; said metallic sleeve being integrally formed with an annular flange, which is clamped between the helical spring and another one of the coupling pieces of the radial spring, and being provided with a threaded inner bore opening at its load-side for connecting the load.

12. Hydraulic bearing comprising a load-side connection; an axially opposed chassis-side connection; and a spring element located between the load-side connection and the chassis-side connection and comprising an elastomer spring acting as an expansion bladder and a radial spring, and a helical spring extending in axial direction and acting as an axial supporting spring; a housing radially enveloping said spring element of the bearing and resting on a chassis; and a hydraulic damping system located between the load-side connection and the chassis-side connection and comprising a working chamber, a throttling channel and an equalising chamber, said hydraulic bearing comprising two spring systems formed as separate elastomer components namely the radial spring and the expansion bladder, the radial spring and the expansion bladder being connected at a load side of the supporting spring by coupling pieces which are rigidly connected with each other in a force-locking or form-locking way, a metallic sleeve connected with the supporting spring and acting as one of the coupling pieces; said metallic sleeve being integrally formed with an annular flange, which is clamped between the helical spring and another one of the coupling pieces of the radial spring, and being provided with a threaded inner bore opening at its load-side for connecting a load, wherein the annular flange of the metallic sleeve engages a complementary recess of a bell-shaped apron of the expansion bladder.

13. Hydraulic bearing comprising: a load-side connection; an axially opposed chassis-side connection; and a spring element located between the load-side side connection and the chassis-side connection and comprising an elastomer spring acting as an expansion bladder and a radial spring, and a helical spring extending in an axial direction and acting as an axial supporting spring; a housing radially enveloping said spring element of the bearing and resting on a chassis; and a hydraulic damping system located between the load-side connection and the chassis-side connection comprising a working chamber, a throttling channel and an equalising chamber, said hydraulic bearing comprising two spring systems formed as separate elastomer components, namely the radial spring and the expansion bladder, the radial spring and the expansion bladder being connected at a load side of the supporting spring by coupling pieces which are rigidly connected with each other in a force-locking or form-locking way, a thrust spring formed as an elastomer buffer while being smooth in a radial direction, the thrust spring supporting the helical spring and a profiled metal sheet which is vulcanized at a top of the thrust spring and follows a three dimensional surface contour of the thrust spring.

* * * * *